US008633607B2

(12) United States Patent
Egedal et al.

(10) Patent No.: US 8,633,607 B2
(45) Date of Patent: Jan. 21, 2014

(54) METHOD, PARK CONTROLLER AND PROGRAM ELEMENT FOR CONTROLLING A WIND FARM

(75) Inventors: Per Egedal, Herning (DK); Dragan Obradovic, Ottobrunn (DE); Michael Stoettrup, Herning (DK); Andrei Szabo, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 13/533,161

(22) Filed: Jun. 26, 2012

(65) Prior Publication Data
US 2013/0161949 A1    Jun. 27, 2013

(30) Foreign Application Priority Data
Jun. 30, 2011    (EP) .................................. 11172201

(51) Int. Cl.
F03D 9/00    (2006.01)
H02P 9/04    (2006.01)
F01D 7/00    (2006.01)
B63H 9/00    (2006.01)
G05D 3/12    (2006.01)

(52) U.S. Cl.
USPC ............................... 290/44; 416/43; 700/267

(58) Field of Classification Search
USPC ................................. 290/44; 416/43; 700/287
See application file for complete search history.

(56) References Cited

U.S. PATENT DOCUMENTS

| 8,033,788 | B2 * | 10/2011 | Egedal et al. | 416/43 |
| 2006/0273595 | A1 * | 12/2006 | Avagliano et al. | 290/44 |
| 2007/0124025 | A1 | 5/2007 | Schram | 700/287 |
| 2009/0180875 | A1 * | 7/2009 | Egedal et al. | 416/43 |

OTHER PUBLICATIONS

Rongyong Zhao et al: "Multi-Agent Model for Fatigue Control in Large Offshore Wind Farm", Computational Intelligence and Security 2008. CIS '08. International Conference, Piscataway, NJ, USA, Dec. 13, 2008, pp. 71-75, XP031379083; Others; 2008.
D. Madjidian et al: "A Distributed Power Coordination Scheme for Fatigue Load Reduction in Wind Farms", 2011 American Control Conference, Jun. 29, 2011, pp. 5219-5224, XP55015313; Others; 2011.

* cited by examiner

Primary Examiner — Pedro J Cuevas

(57) ABSTRACT

The disclosure relates to a method for controlling a wind farm, the wind farm includes at least two wind turbines, the method includes determining the required power, determining fatigue load versus power curves for each wind turbine, and based on the determined fatigue load versus power curves attributing different power settings to the wind turbines such that sum of the power settings of all wind turbines is equal to the required power. Furthermore, the invention concerns a park controller for controlling a wind farm and a program element for controlling a wind farm.

12 Claims, 3 Drawing Sheets

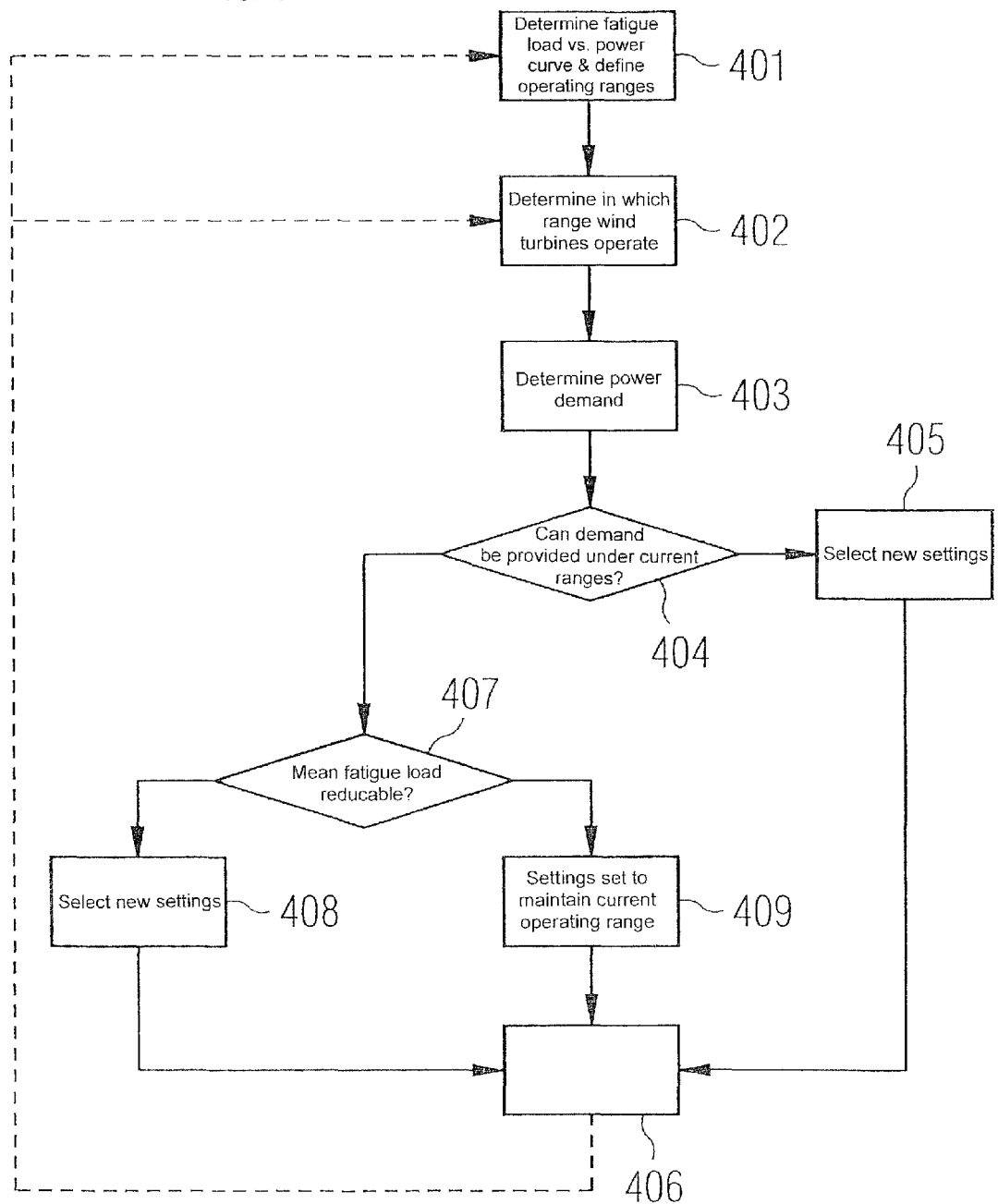

METHOD, PARK CONTROLLER AND PROGRAM ELEMENT FOR CONTROLLING A WIND FARM

CROSS REFERENCE TO RELATED APPLICATIONS

This application claims priority of European Patent Office application No. 11172201.3 EP filed Jun. 30, 2011. All of the applications are incorporated by reference herein in their entirety.

FIELD OF INVENTION

The present disclosure relates to the field of power generation by wind farms. In particular, to a method for controlling a wind farm, a park controller for controlling a wind farm, and a program element for controlling a wind farm.

ART BACKGROUND

Wind farms consisting of several wind turbines become more and more popular as an ecological replacement for nuclear or conventional power plants. Wind farms may be are constructed offshore because higher and more regular wind speeds and wind directions allow for a better power production efficiency. Due to their high efficiency offshore wind farms are often capable of producing more electrical power than the required power actually demanded by the consumers. Accordingly, wind farms are provided with means to adapt the power provided by them to the required power. Offshore wind farms go along with high costs for erecting, revising, repairing, and replacing the wind turbines. Revising, repairing or replacing of the wind turbines is necessary when their life time has ended. Accordingly, there may be a need for extending the mean life time of said wind turbines.

SUMMARY OF THE INVENTION

According to a first aspect there is provided a method for controlling a wind farm, the wind farm comprising at least two wind turbines, the method comprising determining the required power $P_R$, determining the fatigue load versus power curves for each wind turbine, and based on the determined fatigue load versus power curves attributing different power settings $P_{S,i}$ to the wind turbines such that the sum of the power settings $P_{S,i}$ of all wind turbines is equal to the required power $P_R$.

This aspect is based on the idea that the mean fatigue load of the wind turbines can be reduced by operating one wind turbine with a high power setting and another wind turbine with a low power setting instead of operating both wind turbines with the same power setting. The fatigue load refers, for example, to the wear, dynamic stress, stresses by an unbalanced rotor, which may all lead to a material failure thus rendering the wind turbine unusable after a certain time. The fatigue load versus power curves describe the dependency of the fatigue load in view of the power provided by the wind turbine.

According to an embodiment the method additionally comprises defining for each wind turbine a mid power range $P_{M,i}$ comprising only one relative fatigue load maximum and wherein $P_{A,i} < P_{M,i} < P_{B,i}$, defining for each wind turbine a low power range $P_{L,i} < P_{A,i}$ free of a relative fatigue load maximum, defining for each wind turbine a high power range $P_{H,i} > P_{B,i}$ free of a relative fatigue load maximum, and attributing the power settings such that $P_{S,i} \ne P_{M,i}$ for all wind turbines.

In such a way power ranges which imply high a high reduction in life time but offer few advantages in terms of power production may be avoided. Thus a wind farm may be operated more cost efficiently.

According to a further embodiment of the method $P_{A,i}$ and/or $P_{B,i}$ correspond to relative or absolute fatigue load minima.

Selecting $P_{A,i}$ and/or $P_{B,i}$ in this manner may allow to operate the wind turbines in a power range where the mean fatigue load for the wind turbines of the wind farm is optimum.

According to a further embodiment the method comprises determining the current power settings $P_{C,i}$ for all wind turbines, and attributing new power settings $P_{S,i}$ such that $|(P_{S,i}-P_{C,i})/2| \le P_A$ or $|(P_{S,i}-P_{C,i})/2| \ge P_B$ for a maximum of wind turbines.

In this way the mean wear and load on the wind turbines may be reduced by minimizing the number of, in particular rapid, transitions from one operating range to another operating range of each wind turbine and therefore avoiding bypassing power ranges with a relative fatigue load maximum.

According to a still further embodiment of the method the low power ranges $P_{L,i}$ and/or mid power ranges $P_{M,i}$ and/or high power ranges $P_{H,i}$ are equal or different for all wind turbines.

If the low power ranges $P_{L,i}$ and/or mid power ranges $P_{M,i}$ and/or high power ranges $P_{H,i}$ are selected to be equal it may facilitate the regulating mechanism as fewer parameters have to be optimized. However, different low power ranges $P_{L,i}$ and/or mid power ranges $P_{M,i}$ and/or high power ranges $P_{H,i}$ may account for different wind turbine types or for different relative uptimes of the wind turbines. Relative uptime refers to the time a wind turbine has been operational in relation to its assumed life time. In this way the expected time to the next overhaul or replacement of a wind turbine may be adjusted to be equal to the corresponding time of another wind turbine such that they can be overhauled or replaced at the same time which may imply lower costs.

According to another embodiment of the method determining fatigue load versus power curves comprises measuring wind turbine parameters.

While predicted fatigue load versus power curves based on calculations may provide a good first approximation and avoid the need for measuring equipment, measuring the wind turbine parameters may offer a more precise result. As an example the dependency of the vibrations experienced by the wind turbine tower in relation to the electric power provided by the wind turbine may be measured. Alternatively or in addition the static load on the wind turbine tower in relation to the electric power provided by the wind turbine may be measured.

According to a further embodiment of the method determining fatigue load versus power curves comprises determining power versus pitch angle curves and fatigue load versus pitch angle curves. Said pitch angle of wind turbine blade may on the one hand influence the electric power provided by the wind turbine. On the other hand the pitch angle may have an impact on the aerodynamic loads experienced by e.g. the blades and the tower of the wind turbine.

According to another embodiment of the method attributing power settings to the wind turbine comprises attributing pitch angles to the wind turbines.

According to a second aspect a park controller for controlling a wind farm comprising at least two wind turbines is provided, the park controller comprising a required power determination unit for determining the required power to be provided by the wind farm, a fatigue load determination unit for determining the fatigue load versus power dependency of each wind turbine, and an attribution unit for attributing different power settings to the wind turbines such that the sum of the power settings of all wind turbines is equal to the required power.

The park controller for controlling a wind farm may provide an easy way to optimize the mean life time of the wind turbines of a wind park thus reducing the cost for operating the wind farm.

According to a third aspect a program element for controlling a wind farm is provided. The program element, when being executed by a data processer, is adapted for carrying out the method as described above.

Said program element may be easily adaptable to new types of wind turbines. Furthermore the program element may be executed by a data processor of an existing park controller thus providing a facile way to improve the performance of already existing wind farms.

It is to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The examples of embodiment described are to be illustrative but not to limit the invention.

BRIEF DESCRIPTION OF THE DRAWING

FIG. 4 is a flow chart illustrating an exemplary embodiment of the claimed method

DETAILED DESCRIPTION

Figure 1:
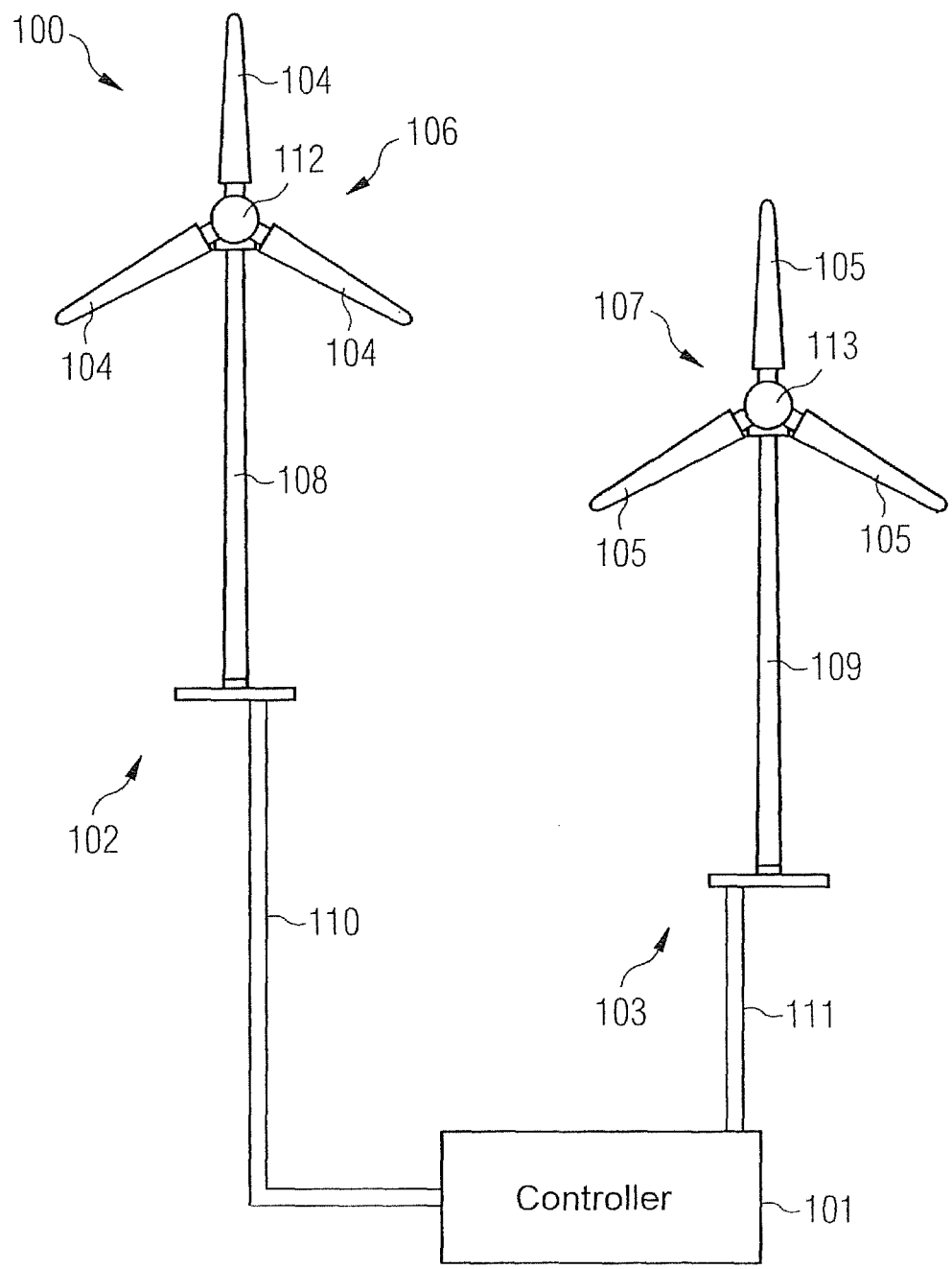
FIG. 1 shows an example of a wind farm and an associated park controller

The illustration in the drawing is schematically. It is noted that in different figures, similar or identical elements are provided with the same reference signs or with reference signs, which are different from the corresponding reference signs only within the first digit.

FIG. 1 shows an example of a wind farm 100 and an associated park controller 101. The wind farm 100 comprises a first wind turbine 102 and a second wind turbine 103. Although first wind turbine 102 and second wind turbine 103 may generally be chosen to be of a different type in this example for illustrative purposes they are chosen to be the same. The rotating speed of each wind turbine rotor 106, 107 is controlled by a combination of the pitch angle and the active power output of each wind turbine 102, 103 to the grid. The active power is controlled via a grid converter (not shown). However, pitch angles and rotating speed have a high impact on the loads experienced by the wind turbine tower 108, 109.

Both wind turbines 102, 103 are connected to the wind park controller 101. The wind park controller 101 not only measures the power currently produced by each wind turbine 102, 103 but also adapts the power settings $P_{S,i}$ of each wind turbine 102, 103 if the required power $P_R$ demanded by the consumer changes. If for example the required power $P_R$ declines the wind park controller 101 may provide the wind turbines 102, 103 with a control signal 110, 111 to reduce the pitch angle. The wind park controller 101 may as well use control signals to indirectly control the pitch angle. For the same purpose the control signal 110, 111 provided by the wind park controller 101 may as well change the parameters of the wind turbine generators 112, 113 or of a gear present between the wind turbine rotors 106, 107 and the wind turbine generators 112, 113. These parameters may all influence the power setting $P_{S,i}$ of each wind turbine. For given wind conditions each power setting $P_{S,i}$ goes along with a different fatigue load experienced by for example the wind turbine tower 108, 109. Intuitively one may expect that fatigue load increases more or less steadily with the power setting $P_{S,i}$.

Figure 2:
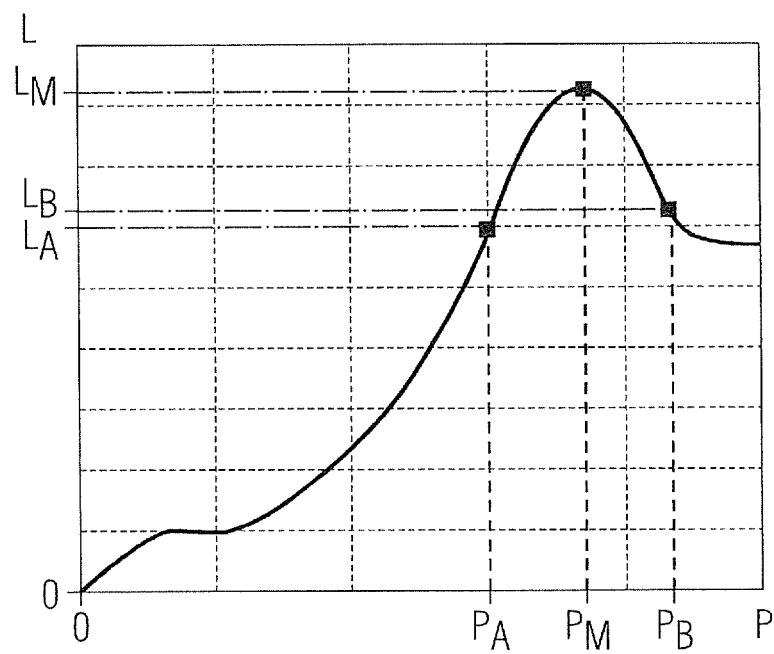
FIG. 2 shows an example of a fatigue load versus power setting curve of a wind turbine

However, inventors found that this is not the case. FIG. 2 describes an example of a typical fatigue load L versus power setting curve P of a wind turbine. As shown in the diagram for very low power settings P the fatigue load L is correspondingly low. A small increase in the power setting first leads to a small fatigue load plateau until the fatigue load increases significantly to reach its maximum at a power setting $P_M$. For power settings beyond $P_M$ the fatigue load decreases again.

If the required power $P_R$ is two times $P_M$ it may be desirable to operate one wind turbine with a power setting $P_A < P_M$ and the other wind turbine with a power setting $P_B > P_M$ such that the sum of $P_A$ and $P_B$ is equal to $P_R$ instead of operating both wind turbines with a power setting $P_M$. In this way the mean fatigue load can be reduced from $L_M$ to $(L_A + L_B)/2$. Accordingly, the mean life time of the wind turbines can be extended and the wind farm operated more cost efficiently.

Figure 3:
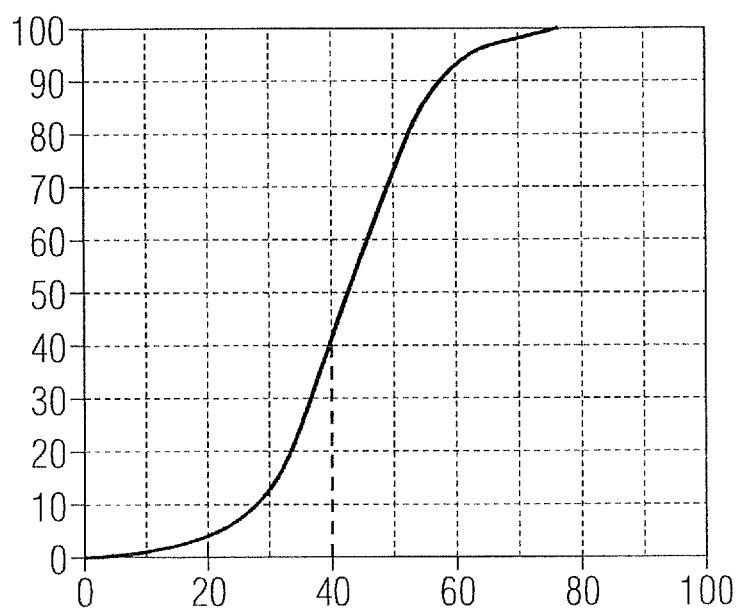
FIG. 3 shows an example of a pitch angle versus power reduction curve of a wind turbine

FIG. 3 illustrates how the pitch angle influences the power setting of a wind turbine. The ordinate corresponds to the percentage of the pitch angle range of the wind turbine where zero percent correspond to a pitch angle for a maximal power setting. The abscissa gives corresponds to the percentage of power reduction. For a power reduction percentage of 20 percent to 40 percent the wind turbine experiences high fatigue loads. Hence, the wind turbine may be operated outside of this region. Accordingly, pitch angles may be selected outside of 5 percent to 40 percent pitch angle range.

An exemplary embodiment of the claimed method will now be described with reference to FIG. 4.

In a first step 401 the fatigue load versus power curves for all wind turbines are determined and operating ranges defined. Then in a second step 402 it is determined in which range the wind turbines operate. Afterwards in a third step 403 the required power demanded by the consumers determined. It is then in a further step 404 evaluated if the required power can be provided while all wind turbines stay in the current operating range. If this is not the case in a next step 405 irrespective of the current operating range increased (or decreased) power settings for all wind turbines are selected and forwarded in a step 406 to the wind turbines. If the required power can be provided while all wind turbines stay in the current operating range the controller proceeds from step 404 to step 407 and evaluates if the mean fatigue load can be reduced by changing the operating ranges of some wind turbines. If this is the case in step 408 power settings for some wind turbines are selected such that some of the wind turbines change their operating range and the sum of all power settings tracks the required power; if not, the power settings are chosen in step 409 such that all wind turbines stay in their current operating range. Finally, the power settings are attributed to the wind turbines in step 406 and the process restarts. However, the step 401 may be omitted as fatigue load versus power curves often do not change between two cycles.

Although the claimed invention has been described with reference to wind turbines having a horizontal rotation axis it is also applicable for wind turbines with vertical axis, of course.

It should be noted that the term "comprising" does not exclude other elements or steps and that "a" or "an" does not exclude a plurality. While specific embodiments have been described in detail, those with ordinary skill in the art will appreciate that various modifications and alternative to those details could be developed in light of the overall teachings of the disclosure. Elements described in association with different embodiments may be combined. It should also be noted that reference signs in the claims should not be construed as limiting the scope of the claims. Accordingly, the particular arrangements disclosed are meant to be illustrative only and not limiting as to the scope of the invention, which is to be given the full breadth of the appended claims, and any and all equivalents thereof.

The invention claimed is:

1. A method for controlling a wind farm, the wind farm comprising a plurality of wind turbines, the method comprising:
   determining the required power $P_R$;
   determining fatigue load versus power curves for each of the plurality of wind turbines, and
   based on the determined fatigue load versus power curves attributing different power settings $P_{S,i}$ to each of the wind turbines such that sum of the power settings $P_{S,i}$ of plurality of wind turbines is equal to the required power $P_R$.

2. The method as set forth in claim 1, further comprising for each of the plurality of wind turbines:
   defining a mid power range $P_{M,i}$ comprising only one relative fatigue load maximum and wherein $P_{A,i}<P_{M,i}<P_{B,i}$;
   defining a low power range $P_{L,i} \leq P_{A,i}$ free of a relative fatigue load maximum;
   defining a high power range $P_{H,i} \geq P_{B,i}$ free of a relative fatigue load maximum; and
   attributing the power settings such that $P_{S,i} \neq P_{M,i}$.

3. The method as set forth in claim 2, wherein $P_{A,i}$ and/or $P_{B,i}$ correspond to relative or absolute fatigue load minima.

4. The method as set forth in claim 2, further comprising for each of the plurality of wind turbines:
   determining the current power settings $P_{C,i}$, and
   attributing new power settings $P_{S,i}$ such that $|(P_{S,i}-P_{C,i})/2|\leq P_A$ or $|(P_{S,i}-P_{C,i})/2|\geq P_B$.

5. The method as set forth in claim 2, wherein the low power ranges $P_{L,i}$ and/or mid power ranges $P_{M,i}$ and/or high power ranges $P_{H,i}$ are equal or different for all wind turbines.

6. The method as set forth in claim 2, wherein at least some of the low power ranges $P_{L,i}$ for the plurality of wind turbines are different.

7. The method as set forth in claim 2, wherein at least some of the high power ranges $P_{H,i}$ for the plurality of wind turbines are different.

8. The method as set forth in claim 2, wherein determining fatigue load versus power curves comprises measuring wind turbine parameters.

9. The method as set forth in claim 2, wherein determining fatigue load versus power curves comprises determining power versus pitch angle curves and fatigue load versus pitch angle curves.

10. The method as set forth in claim 2, wherein attributing power settings to the wind turbine comprises attributing pitch angles to the wind turbines.

11. A park controller for controlling a wind farm, the wind farm comprising a plurality of wind turbines, the park controller comprising
    a required power determination unit for determining the required power to be provided by the wind farm,
    a fatigue load determination unit for determining the fatigue load versus power dependency of each wind turbine, and
    an attribution unit for attributing different power settings to the wind turbines such that the sum of the power settings of all wind turbines is equal to the required power.

12. A program element for controlling a wind farm, the program element, when being executed by a data processor, is adapted for carrying out the method as set forth in claim 1.

* * * * *